US 6,626,783 B1

(12) United States Patent
Shimada et al.

(10) Patent No.: US 6,626,783 B1
(45) Date of Patent: Sep. 30, 2003

(54) BELT FOR CONTINUOUSLY VARIABLE TRANSMISSION

(75) Inventors: Takamichi Shimada, Wako (JP); Shigeru Kanehara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/657,629

(22) Filed: Sep. 8, 2000

(30) Foreign Application Priority Data

Sep. 8, 1999 (JP) ............................................. 11-254299

(51) Int. Cl.$^7$ .............................. F16G 5/16; F16G 1/22
(52) U.S. Cl. ........................................ 474/242; 474/201
(58) Field of Search ................................ 474/242, 245, 474/248, 240, 201, 244, 249, 247, 272

(56) References Cited

U.S. PATENT DOCUMENTS

| | | | | |
|---|---|---|---|---|
| 4,526,559 A | * | 7/1985 | Smirl | 474/201 |
| 5,004,450 A | * | 4/1991 | Ide | 474/242 |
| 5,011,461 A | * | 4/1991 | Brouwers | 474/201 |
| 5,019,020 A | * | 5/1991 | Van Lith | 474/240 |
| 5,152,722 A | * | 10/1992 | Yamada | 474/240 |
| 5,169,369 A | * | 12/1992 | Masuda et al. | 474/242 |
| 6,110,065 A | * | 8/2000 | Yagasaki et al. | 474/244 |

FOREIGN PATENT DOCUMENTS

| | | |
|---|---|---|
| EP | 0 377 918 | 7/1990 |
| JP | 2-225840 | 9/1990 |

OTHER PUBLICATIONS

Copy of European Patent Office Search Report for corresponding European Patent Application No 00 11 9655 dated Nov. 29, 2000.

* cited by examiner

Primary Examiner—Marcus Charles
(74) Attorney, Agent, or Firm—Armstrong, Westerman & Hattori, LLP

(57) ABSTRACT

To prevent undesirable displacement of the metal elements of a metal ring assembly of a continuously variable transmission in order to enhance the durability of the metal ring assembly, the metal elements are designed to meet the equation $B/2=A+L$ and $t=1.5A$, where A is a distance between a rocking edge and a saddle surface of a metal element; B is a distance between the saddle surface and a lower end of a pulley abutment surface; L is a distance between the rocking edge and a frictional force application point of the pulley abutment surface; t is the thickness of the metal element; and the distances A and B are set so that a relation, $2 \leq B/A \leq 5$, is established.

2 Claims, 10 Drawing Sheets

TANGENT FRICTIONAL FORCE FV

TANGENT FRICTIONAL FORCE FV

URGING FORCE E BETWEEN METAL ELEMENTS

STRAIN GAUGE

STRAIN GAUGE

STRAIN GAUGE

BELT FOR CONTINUOUSLY VARIABLE TRANSMISSION

BACKGROUND OF THE INVENTION

1. Field of the Invention

The present invention relates to a belt for a continuously variable transmission which includes a metal ring assembly comprised of a plurality of endless metal rings laminated one upon another, and a plurality of metal elements each having a ring slot into which the metal ring assembly is fitted, and which is wound around a drive pulley and a driven pulley to transmit a driving force between the drive pulley and the driven pulley.

2. Description of the Related Art

There is such a belt for the continuously variable transmission, which is known from Japanese Patent Application Laid-open No. 2-225840, and in which the gravity center of the metal element is positioned in the vicinity of, or radially outside (above), a rocking edge in order to eliminate the gap formed between the adjacent metal elements in a chord section extending from the driven pulley to the drive pulley, and to bring the metal elements into engagement with the drive pulley in a correct attitude in which they are not inclined forwardly or rearwardly.

The conventionally known belt is intended to stabilize the attitude of the metal element in the chord section extending from the driven pulley to the drive pulley, but does not have an effect of stabilizing the attitude of the metal element which is in engagement with the pulley.

More specifically, if the metal element engaged with the pulley is pitched forwardly or rearwardly from a radial direction about the axis of rotation of the pulley, there is a possibility that the state of the metal element engaged with the pulley will become abnormal, whereby the attitude of the metal element will not only become unstable, but also front and rear edges of the saddle surface of the metal element will be brought into local contact with the lower surface of the metal ring assembly to exert an adverse influence upon the durability of the metal ring assembly. The direction and magnitude of the pitching of the metal element are determined depending on a tangent frictional force FV received from the surface of contact with the pulley by the metal element and an urging force E provided between the respective metal elements. The tendency of inclination of the metal element is particularly conspicuous in an exit region of the driven pulley. The reason will be described below.

It is known that the tangent frictional force FV received by the metal element 32 (see FIG. 3) from the drive pulley 6 or the driven pulley 11 is large in the exit region of the drive pulley 6 or the driven pulley 11, as shown in FIGS. 7A and 7B, and assumes a value about four times a value provided when the tangent frictional force FV has been averagely distributed over the entire wound region of the pulley 6 or 11 by a reason that the pulley 6 or 11 has been deformed, resulting in the concentration of an axial thrust, or for another reason. As is apparent from FIG. 3, the tangent frictional force FV is applied to the metal element 32 so as to fall the metal element forwardly in the direction of movement about the swinging center 44.

In addition, as shown in FIG. 7B, the urging force E provided between the metal elements 32 and inhibiting the inclination of the metal element 32 assumes a large value in the exit region (position b) of the drive pulley 6, but is 0 (zero) in the exit region (positioned) of the driven pulley 11.

As is apparent from FIG. 3, a radial frictional force $E_1$ is applied to the front and rear surfaces of the metal element 32 by the urging force E so as to fall the metal element 32 rearwardly in the direction of movement about the swinging center 44; namely, so as to oppose a moment generated by the tangent frictional force FV. Therefore, in a position where the tangent frictional force FV inclining the metal element 32 forwardly in the direction of movement is largest and the urging force E inhibiting the inclination of the metal elements 32 is 0 (zero), i.e., in the exit region (the position d) of the driven pulley 11, the metal element 32 is liable to be inclined to the largest extent.

The reason why the peak value of the tangent frictional force FV received by the metal element 32 from the driven pulley 11 reaches about four times the value provided when the tangent frictional force FV has been averagely distributed over the entire wound region of the pulley 11, is considered as follows:

FIG. 8 shows the results of the measurement of the tangent frictional force FV and the urging force E between the metal elements 32 to determine how they are varied in accordance with a variation in rotational angle θ. Points a, e, b, c, f and d on the axis of the abscissas correspond to the positions shown in FIG. 7B, respectively. As shown in FIGS. 9A and 9B, a sensor for measuring the urging force E between the metal elements 32 comprises an assembly which includes a beam formed into a U-shape and a strain gauge attached to an inner surface of the beam and which is mounted in a recess defined in the main surface of the metal element 32. The sensor measures the urging force E, based on the flexure of the beam produced by the urging force E. As shown in FIG. 10, a sensor for measuring the tangent frictional force FV of the metal element 32 comprises strain gauges attached in a pair of recesses defined in laterally opposite sides of an element body of the metal element 32, and measures the tangent frictional force FV based on the flexure of the element body produced by the tangent frictional force FV. It should be noted that the element body is flexed by an axial thrust transmitted from the V-face of the pulley to the metal element 32 and hence, an output from the strain gauge includes a component provided by the tangent frictional force FV and a component (a constant value) provided by the axial thrust transmitted from the V-face of the pulley.

As is apparent from FIGS. 7 and 8, the tangent frictional force FV assumes a peak value in the position in the exit region of the driven pulley 11, and the urging force E assumes the maximum value in the position f (point P) short of the position d. The urging force between the metal elements 32 is generated by the tangent frictional force FV received by the metal elements 32 from the pulley, and a rate of variation in urging force E is proportional to the tangent frictional force FV. Namely, an equation, $dE/d\theta = k * FV$ is established, wherein θ represents a rotational angle of the pulley, and k is a constant.

In FIG. 8, when the urging force E assumes the maximum value at the point P, $dE/d\theta = 0$ is established and hence, the tangent frictional force FV is equal to 0 (zero) at the point P. As described above, the graph of the tangent frictional force FV in FIG. 8 includes the component provided by the tangent frictional force FV and the component provided by the axial thrust transmitted from the V-face of the pulley, but a substantial tangent frictional force FV resulting from the elimination of the component provided by the axial thrust transmitted from the V-face of the pulley can be detected by determining a point on the axis of the abscissas at which the tangent frictional force FV is equal to 0 (zero) from the point P at which $dE/d\theta$ is equal to 0 (zero).

The tangent frictional force FV assuming 0 (zero) at the point f reaches a peak value $A_{MAX}$ at the point d corresponding to the exit of the driven pulley 11, but an integration value of tangent frictional force FV between the points f and d corresponds to one half of an area $(A_{MAX} * L_1)$ of a triangle having a base provided by a distance $L_1$ between the points f and d and a height provided by the peak value $A_{MAX}$ (see an obliquely-lined region shown in FIG. 8). On the other hand, the tangent frictional force FV is distributed uniformly in a region between the points c and d, which is a wound region of the driven pulley 11. If it is supposed that an average value of the tangent frictional force FV is $A_{AVE}$, an integration value of the tangent frictional force FV between the points c and d corresponds to an area $A_{AVE} * L_2$ of a rectangle having a base provided by a distance $L_2$ between the points c and d and a height provided by the average value $A_{AVE}$. Thus, it can be seen that a value $A_{max}/A_{AVE}$ calculated according to $(A_{MAX} * L_1)/2 = A_{AVE} * L_2$ is nearly equal to 4, and the peak value $A_{MAX}$ of the tangent frictional force FV is about four times the average value $A_{AVE}$.

The metal element 32 receives the large tangent frictional force FV in the exit region of the driven pulley 11 where the urging force E between the metal elements 32 is equal to 0 (zero), as described above. For this reason, the pitching of the metal element 32 is produced by the tangent frictional force FV, thereby creating the above-described disadvantage.

The present invention has been accomplished with the above circumstances in view, and it is an object of the present invention to prevent the inclination of the metal elements engaged with the pulley to enhance the durability of the metal ring assembly.

SUMMARY OF THE INVENTION

To achieve the above object, according to one aspect of the present invention, there is provided a belt for a continuously variable transmission, comprising a metal ring assembly including a plurality of endless metal rings laminated one upon another, and a plurality of metal elements each having a ring slot into which the metal ring assembly is fitted, the belt being wound around a drive pulley and a driven pulley to transmit a driving force between the drive pulley and the driven pulley, the metal element including a saddle surface against which a lower surface of the metal belt assembly fitted in the ring slot abuts, pulley abutment surfaces provided below the ring slot to abut against the drive pulley and the driven pulley, and a rocking edge about which the preceding and succeeding metal elements are pitched relative to each other, wherein the distance A between the rocking edge and the saddle surface of the metal element and the distance L between the frictional force application point of the rocking edge and the pulley abutment surface of the metal element are set to be substantially equal to each other.

With the above arrangement, the distance A between the rocking edge and the saddle surface of the metal element and the distance L between the rocking edge and the frictional force application point of the pulley abutment surface of the metal element are set to be substantially equal to each other. Therefore, the frictional force application point can be set to be close to the rocking edge to the utmost, thereby reducing the pitching moment generated about the rocking edge by a tangent frictional force applied to the frictional force application point. As a result, even if a large tangent frictional force is applied to the frictional force application point of the metal element, the pitching caused by the tangent frictional force can be suppressed to the minimum to stabilize the attitude of the metal element, and it is possible to prevent an upper surface of the metal ring assembly from being brought into contact with an upper edge of the ring slot to reduce the durability of the metal ring assembly.

According to another aspect of the present invention, in addition to the arrangement of the first aspect, if the distance between the saddle surface and the lower end of the pulley abutment surface of the metal element is represented by B, and the thickness of the metal element is represented by t, equations, $B/2=A+L$ and $t=1.5A$, are established, and the distances A and B are set, so that a relation, $2 \leq B/A \leq 5$, is established.

With the above arrangement, the distance A between the rocking edge and the saddle surface and the distance B between the saddle surface and the lower end of the pulley abutment surface satisfy a relation, $B/A \leq 5$. Therefore, even when the tangent frictional force reaches a peak value in an exit region of the driven pulley, a pitching moment generated by the tangent frictional force and acting to project the metal element forwardly in a direction of movement can be suppressed by a pitching moment generated in the opposite direction by a load in the radial direction inwardly transmitted from the metal ring assembly to the ring slot, thereby reliably preventing the falling of the metal element. In addition, the distances A and B satisfy a relation, $2 \leq B/A$ and hence, it is possible to prevent the metal element from falling rearwardly in the direction of movement in the exit region of the driven pulley, and to effectively reduce the gap between the metal elements spaced apart from each other in a chord section extending from the driven pulley to the drive pulley.

BRIEF DESCRIPTION OF THE DRAWINGS

The present invention will now be described by way of an embodiment shown in the accompanying drawings in which:

FIGS. 6A and 6B are diagrams each showing shapes of a metal element wherein FIG. 6A illustrates the invention and FIG. 6B illustrates a conventional metal element;

DESCRIPTION OF THE PREFERRED EMBODIMENT OF THE INVENTION

Figure 2:
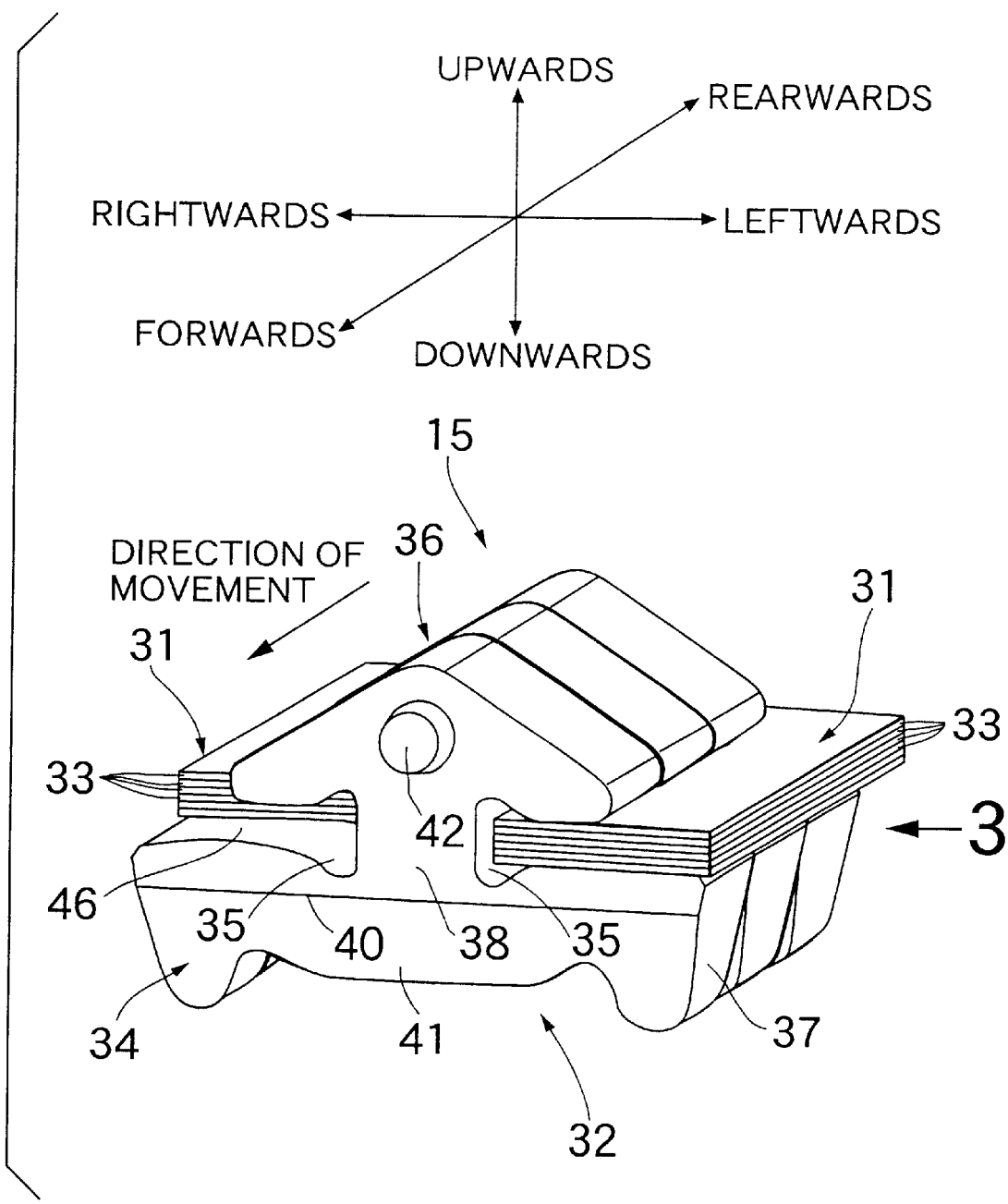
FIG. 2 is a partial perspective view of a metal belt.

The definition of forward and rearward directions, a lateral direction and a vertical direction of a metal element used in the description embodiment is shown in FIG. 2.

Figure 1:
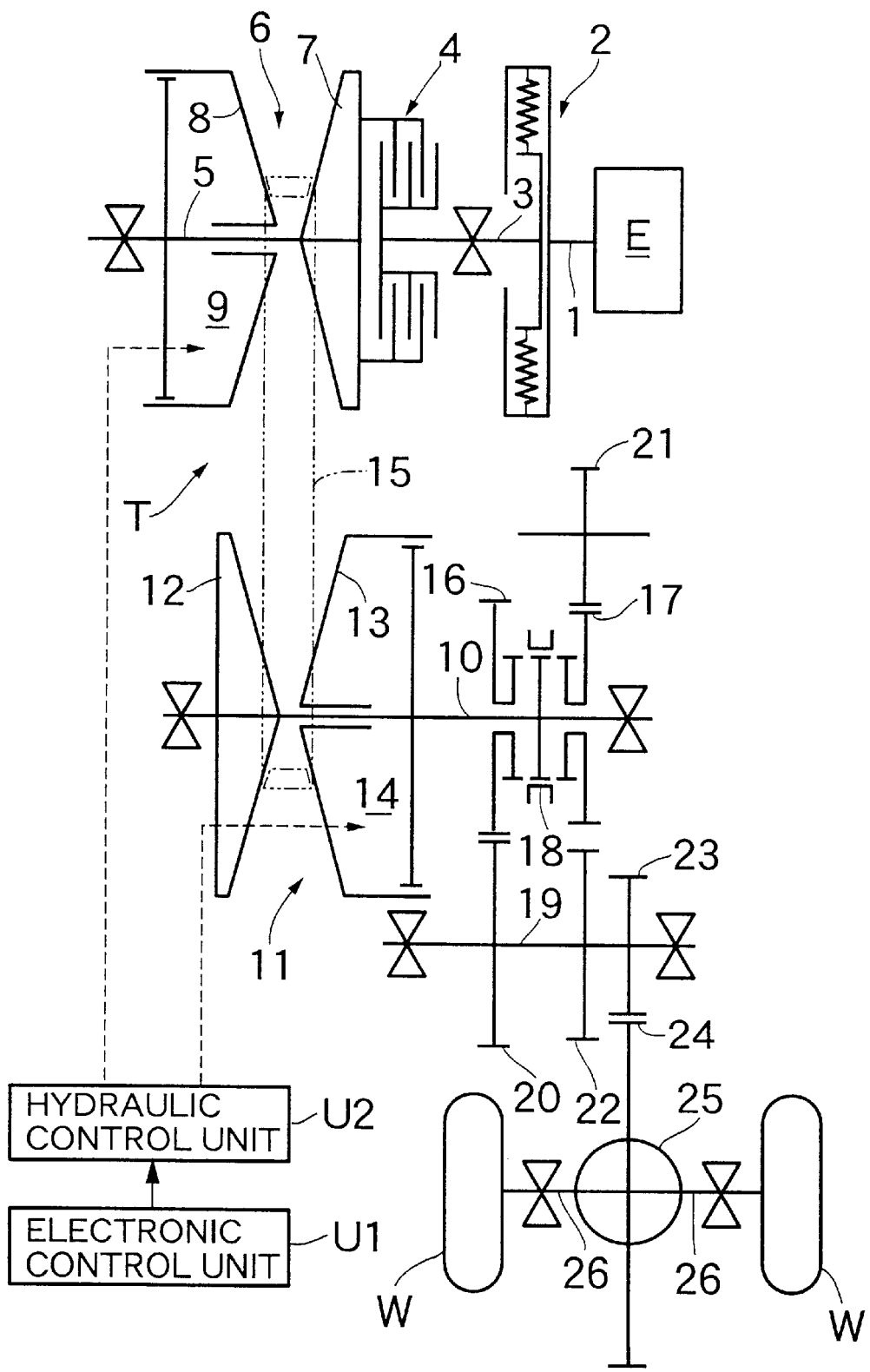
FIG. 1 is a schematic illustration of a power transmitting system for a vehicle equipped with a continuously variable transmission.

FIG. 1 schematically shows the structure of a metal belt type continuous variable transmission T mounted in an automobile. An input shaft 3 connected to a crankshaft 1 of an engine E through a damper 2 is connected to a drive shaft 5 of the metal belt type continuous variable transmission T through a start clutch 4. A drive pulley 6 provided on the drive shaft 5 includes a stationary pulley half 7 secured to the drive shaft 5, and a movable pulley half 8 which can be moved toward and away from the stationary pulley half 7. The movable pulley half 8 is biased toward the stationary pulley half 7 by hydraulic pressure applied to an oil chamber 9.

A driven pulley 11 is provided on a driven shaft 10 disposed in parallel to the drive shaft 5, and includes a stationary pulley half 12 secured to the driven shaft 10, and a movable pulley half 13 which can be moved toward and away from the stationary pulley half 12. The movable pulley half 13 is biased toward the stationary pulley half 12 by hydraulic pressure applied to an oil chamber 14. A metal belt 15 is wound around the drive pulley 6 and the driven pulley 11 (see FIG. 2), and includes a plurality of metal elements 32 supported on a pair of left and right metal ring assemblies 31, 31. Each of the illustrated metal ring assemblies 31, 31 includes twelve metal rings 33 which are laminated on one another.

A forward drive gear 16 and a backward drive gear 17 are relatively rotatably supported on the driven shaft 10. The forward drive gear 16 and the backward drive gear 17 can be coupled selectively to the driven shaft 10 by a selector 18. A forward driven gear 20 meshed with the forward drive gear 16 and a backward driven gear 22 meshed with the backward drive gear 17 through a backward idling gear 21 are secured to an output shaft 19 which is disposed in parallel to the driven shaft 10.

The revolution or rotation of the output shaft 19 is input to a differential 25 through a final drive gear 23 and a final driven gear 24, and is transmitted therefrom through left and right axles 26, 26 to driven wheels W, W.

A driving force of the engine E is transmitted to the driven shaft 10 through the crankshaft 1, the damper 2, the input shaft 3, the start clutch 4, the drive shaft 5, the drive pulley 6, the metal belt 15 and the driven pulley 11. When a forward travel range is selected, the driving force of the driven shaft 10 is transmitted to the output shaft 19 through the forward drive gear 16 and the forward driven gear 20, thereby allowing the vehicle to travel forwardly. When a backward travel range is selected, the driving force of the driven shaft 10 is transmitted to the output shaft 19 through the backward drive gear 17, the backward idling gear 21 and the backward driven gear 22, thereby allowing,the vehicle to travel rearwardly.

At that time, hydraulic pressures applied to the oil chamber 9 of the drive pulley 6 and the oil chamber 14 of the driven pulley 11 of the metal belt type continuous variable transmission T are controlled by a hydraulic pressure control unit $U_2$ which is operated by a command from an electronic control unit $U_1$, thereby adjusting the change gear ratio continuously or in a stepless manner. That is, if a hydraulic pressure applied to the oil chamber 14 of the driven pulley 11 is increased relative to a hydraulic pressure applied to the oil chamber 9 of the drive pulley 6, the groove width of the driven pulley 11 is reduced, leading to an increased effective radius, and correspondingly, the groove width of the drive pulley 6 is increased, leading to a reduced effective radius. Therefore, the change gear ratio of the metal belt type continuous variable transmission T is varied toward "LOW" continuously or in the stepless manner. On the other hand, if the hydraulic pressure applied to the oil chamber 9 of the drive pulley 6 is increased relative to the hydraulic pressure applied to the oil chamber 14 of the driven pulley 11, the groove width of the drive pulley 6 is reduced, leading to an increased effective radius, and correspondingly, the groove width of the driven pulley 11 is increased, leading to a reduced effective radius. Therefore, the change gear ratio of the metal belt type continuous variable transmission T is varied toward "OD" continuously or in the stepless manner.

Figure 3:
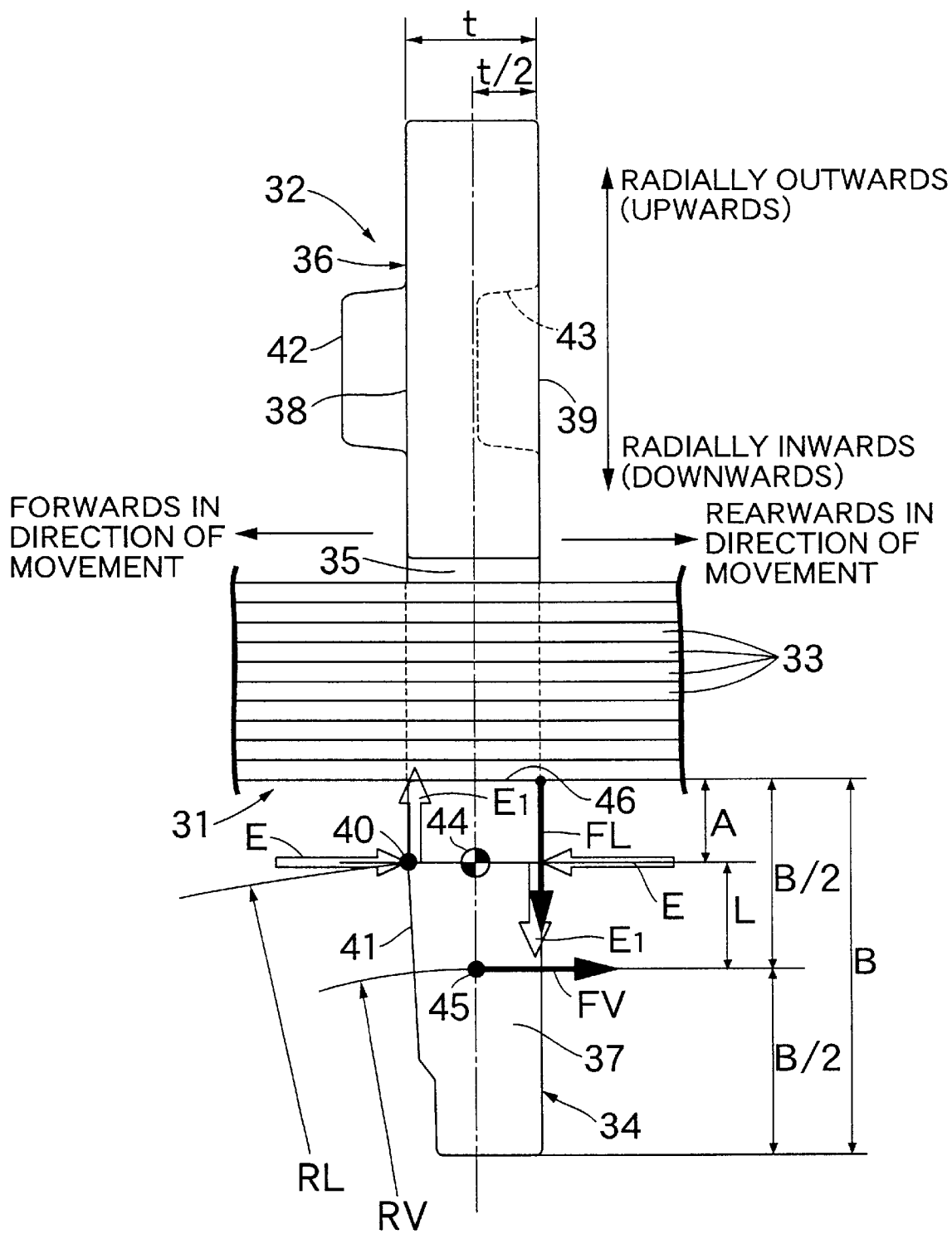
FIG. 3 is an enlarged view taken in the direction of arrow 3 in FIG. 2.

As shown in FIGS. 2 and 3, each of the metal elements 32, which is formed from a metal plate by punching or stamping in a pressing manner, includes a substantially trapezoidal element body 34, and a substantially triangular ear 36 connected to an upper portion of the element body 34 through a pair of ring slots 35, 35 into which the metal ring assemblies 31, 31 are fitted. The element body 34 is formed at its laterally opposite ends with a pair of pulley abutment surfaces 37, 37 capable of abutting against V-faces of the drive pulley 6 and the driven pulley 11. The metal element 32 is formed, at its front and rear portions in the direction of movement, with a pair of front and rear main surfaces 38 and 39 perpendicular to the direction of movement. An inclined surface 41 is formed below the front main surface 38 in the direction of movement with a laterally extending rocking edge 40 located therebetween. Further, a projection 42 and a recess 43 for receiving a corresponding projection from an adjacent metal element are formed on the front and rear main surfaces 38 and 39 in the direction of movement at locations within the region of the ear 36, respectively. Saddle surfaces 46, 46 forming lower edges of the ring slots 35, 35 support lower surfaces of the metal ring assemblies 31, 31, respectively.

In the adjacent metal elements 32 lying on a chord section (chord section for transmitting a driving force) extending on an advancing side from the drive pulley 6 toward the driven pulley 11, the front main surface 38 of the succeeding metal element 32 and the rear main surface 39 of the preceding metal element 32 are in abutment against each other with the front projection 42 of the succeeding metal element 32 being fitted in the rear recess 43 of the preceding metal element 32 and in this state, the driving force is transmitted. The metal elements 32 wound around the drive pulley 6 and the driven pulley 11 are, respectively, pivotally displaced relative to one another around the rocking edges 40 and arranged in a radial direction in a state in which the contact of the main surfaces 38 and 39 with each other has been released.

The inclination of the metal element 32 in a pitching direction will be considered below with reference to FIG. 3. The metal element 32 has the rocking edge 40 provided on its front surface in the direction of movement in order to permit the inclination of the metal element 32 in the pitching direction. However, the center 44 of pivotal movement of the metal element 32 actually causing a pitching is a location corresponding to the widthwise center of the metal element 32 lying at the rear of the rocking edge 40. This is because the inclination of the metal element 32 is inhibited with the ring slot 35 fitted over the metal ring assembly 31 and hence, if the metal element 32 is inclined, the inclination is about a location in which the reaction force received from the metal ring assembly 31 is minimum, i.e., about the pivotal center 44.

In an exit region of the driven pulley 11, the tangent frictional force FV applied to the metal element 32 assumes a peak value, and the urging force between the metal elements 32 is 0 (zero). Therefore, the metal element 32 is liable to be inclined to the largest extent in the exit region of the driven pulley 11.

FIG. 3 shows the balance of forces applied to the metal element 32 having a thickness t in the exit region of the driven pulley 11. The tangent frictional force FV applied from the driven pulley 11 to the metal element 32 is applied at a frictional force application point 45 lying substantially in the center in the upward and downward direction of the pulley abutment surface 37 of the metal element 32, and the direction of the tangent frictional force FV is rearwardly in the direction of movement to inhibit the advance of the metal element 32. If the radius of the center 44 of pivotal movement of the driven pulley 11 about a rotational axis is represented by RL, and the radius of the frictional force application point 45 about the rotational axis of the driven pulley 11 is represented by RV, a distance L between the rocking edge 40 and the frictional force application point 45 is given by "RL–RV". Therefore, a counterclockwise moment FV×L is applied to the metal element 32 about the pivot center 44 by the tangent frictional force FV. This counterclockwise moment FV×L acts to displace the metal element 32 forwardly (to displace the radially outer end, namely, upper end of the metal element 32 forwardly).

When the metal element 32 has been displaced forwardly, a load FL in the radial direction inwardly is applied from the metal ring assembly 31 to a rear end edge of the saddle surface 46, and generates a clockwise moment FL×(t/2) about the pivot center 44. Therefore, when the moment generated by the tangent frictional force FV and the moment generated by the load FL in the radial direction inwardly are balanced with each other, the following equation is established:

$$FV \times L = FL \times (t/2) \qquad (1)$$

If a distance between the rocking edge 40 and the saddle surface 46 of the metal element 32 is represented by A; a distance between the saddle surface 46 and the lower end of the pulley abutment surface 37 of the metal element 32 is by B; and a distance between the rocking edge 40 and the frictional force application point 45 of the pulley abutment surface 37 of the metal element 32 is by L, the following equation is established, because the frictional force application point 45 lies substantially in the center in the upward and downward direction of the pulley abutment surface 37 as described above:

$$B/2 = A + L \qquad (2)$$

In addition, in the present embodiment, the following equation is established between the thickness t of the metal element 32 and the distance A between the rocking edge 40 and the saddle surface 46:

$$t = 1.5A \qquad (3)$$

Therefore, if an equation resulting from the replacement of the equations (2) and (3) into the equation (1) to eliminate t and L is rearranged for B/A, the following equation is provided:

$$B/A = 2 + 1.5(FL/FV) \qquad (4)$$

Figure 4:
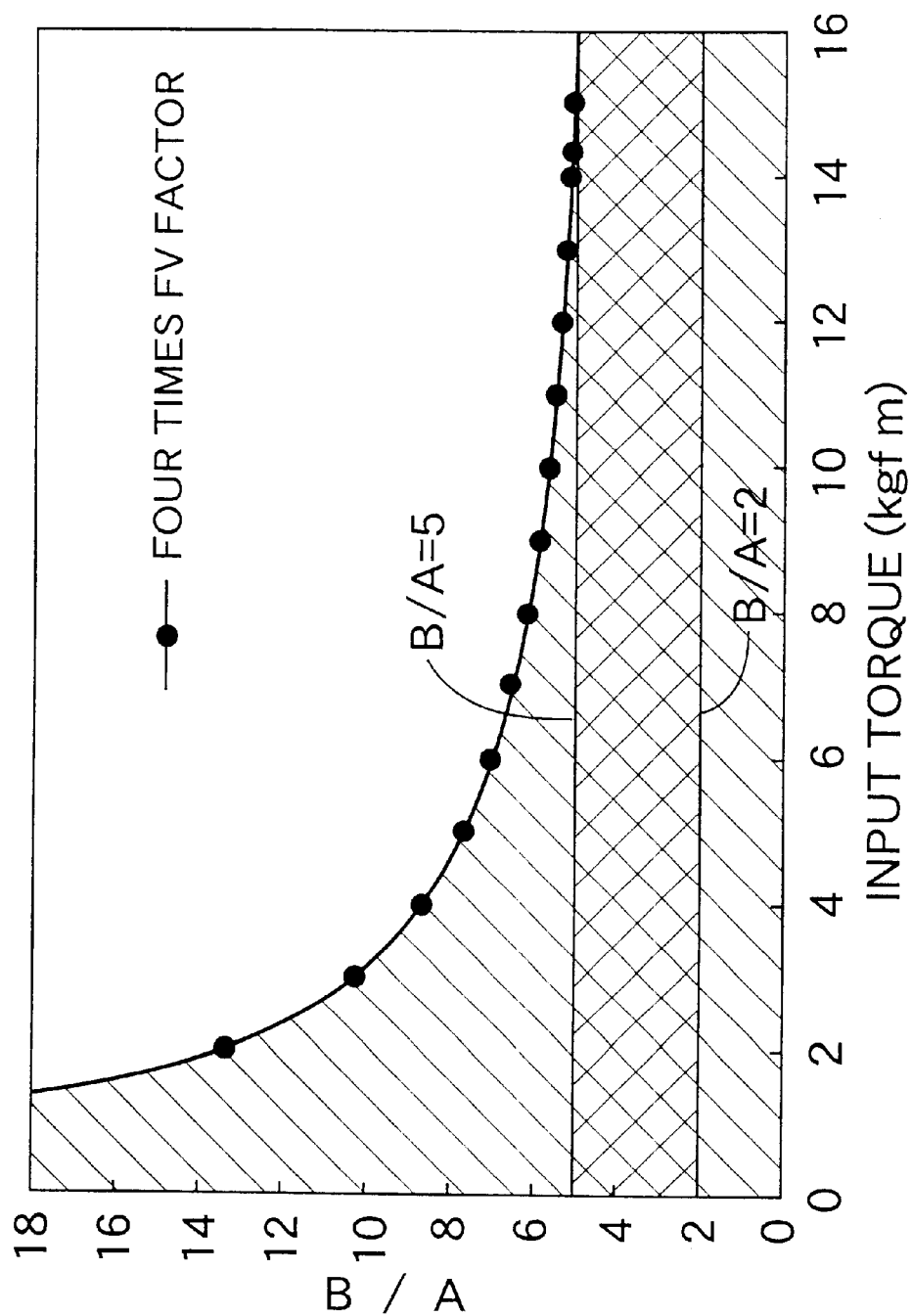
FIG. 4 is a graph showing a suitable range of B/A.

A graph shown in FIG. 4 is made by plotting values of B/A obtained from the above equation (4) using the load FL in the radial direction inwardly and the tangent frictional force FV generated upon the operation of the metal belt type continuously variable transmission T at an input rotational speed of 6,000 rpm and at a ratio of 0.61 with the input torque varied (a maximum value of 14.3 kgfm). In this case, the thickness t of the metal element 32 is 1.5 mm; and the tangent frictional force FV used in the equation (4) is a peak value of tangent frictional force FV generated in the exit region of the driven pulley 11 (a value about four times a value provided assuming that the tangent frictional force FV has been averagely distributed over the entire wound region of the driven pulley 11).

As is apparent from FIG. 4, the value of B/A is decreased with an increase in input torque. When the input torque reaches a maximum value of 14.3 kgfm corresponding to the severest operating condition, FV is equal to 10.84 kgf (a peak value), and FL is equal to 22.66 kgf and hence, B/A is equal to 5. Namely, in the present embodiment, if the value of B/A is set at 5 or less, even in the exit region of the driven pulley which is in the highest-speed operation in which the operating condition is severest and in which the tangent frictional force FV reaches a peak value about four times an average value, the moment FL×(t/2) generated by the load FL in the radial direction inwardly can be increased to a value larger than the moment FV×L generated by the tangent frictional force FV to prevent the pitching of the metal element 32.

On the other hand, the lower limit value of B/A is defined by $2 \leq B/A$. The reason will be described below.

Figure 5:
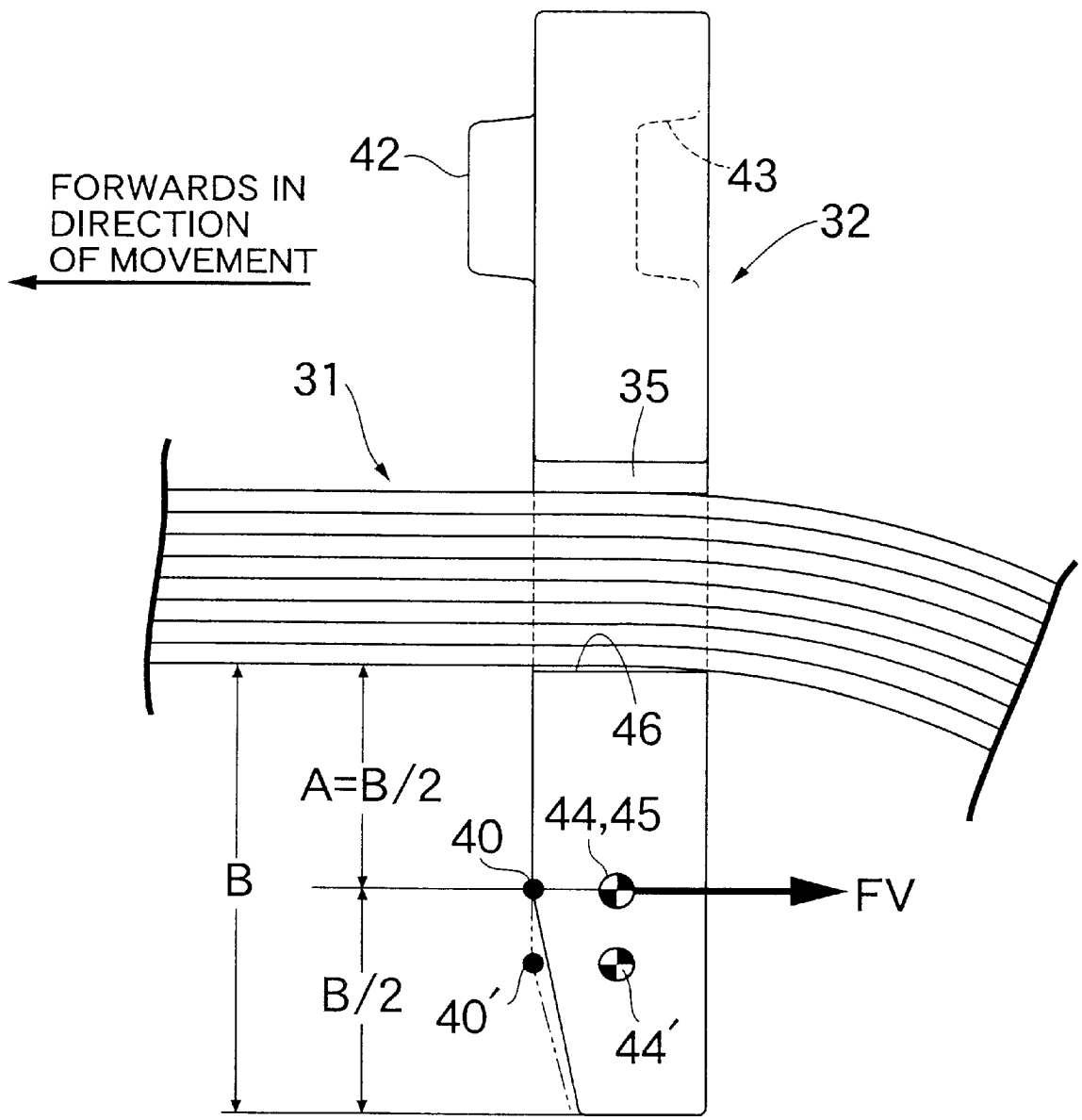
FIG. 5 is a diagram for explaining the foundation of $B/A \geq 2$.

FIG. 5 shows an instant at which the metal element 32 having a value of B/A set at 2 (namely, B=2 A and L=0) leaves the driven pulley 11. The setting of B=2 A ensures that the frictional force application point 44, at which the tangent frictional force FV is applied from the driven pulley 11 to the metal element 32, coincides with the pivot center 44 and hence, the pitching moment generated about the pivot center 44 by the tangent frictional force FV is 0 (zero).

Meanwhile, it is known that a gap is created between the adjacent metal elements 32 in a chord section from the driven pulley 11 toward the drive pulley 6. To bring the metal element 32 into correct engagement with the drive pulley 6, it is necessary to close the gap before the engagement of the metal element 32 with the drive pulley 6. For this purpose, a pitching moment is applied in a direction to displace the metal element 32 forwardly in the direction of movement to the metal element 32 leaving the driven pulley 11, so that the metal element 32 is biased forwardly in the direction of movement by the pitching moment to close the gap.

However, if the value of B/A is set smaller than 2, the rocking edge 40 and the pivot center 44 are displaced downwardly toward 40' and 44', and the tangent frictional force FV is applied to the metal element 32 to displace the metal element 32 rearwardly in the direction of movement about a new pivot center 44'. For this reason, it has failed to close the gap created between the metal elements 32. Therefore, it is necessary to define the lower limit value of B/A by $2 \leq B/A$.

From the forgoing, an appropriate range for the value of B/A is represented by the following expression, as shown as a reticulated region in FIG. 4:

$$2 \leq B/A \leq 5 \qquad (5)$$

Figure 6A:
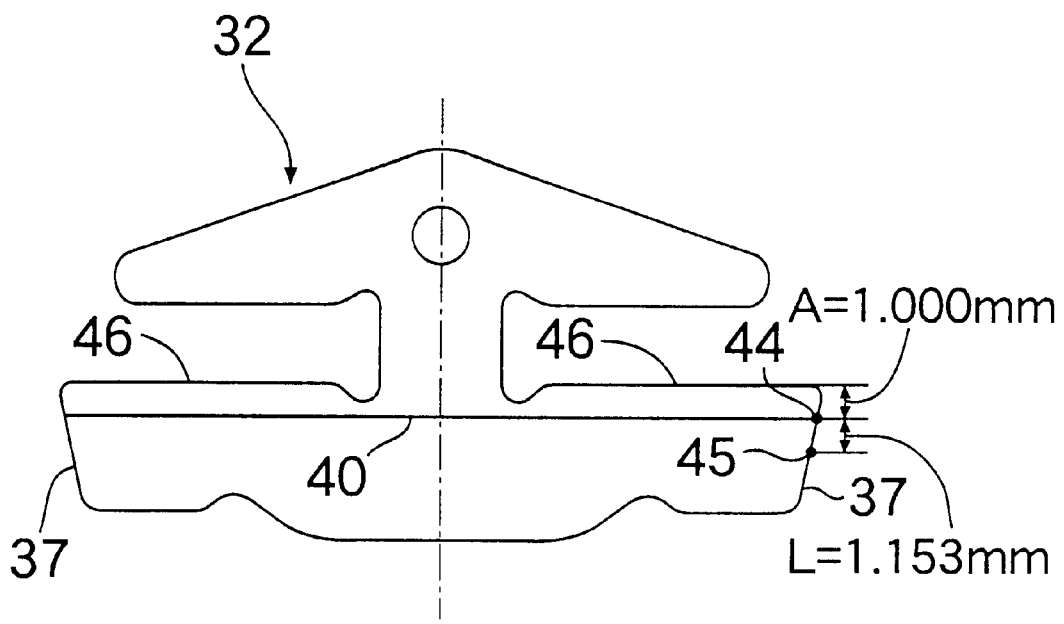
Figure 6B:
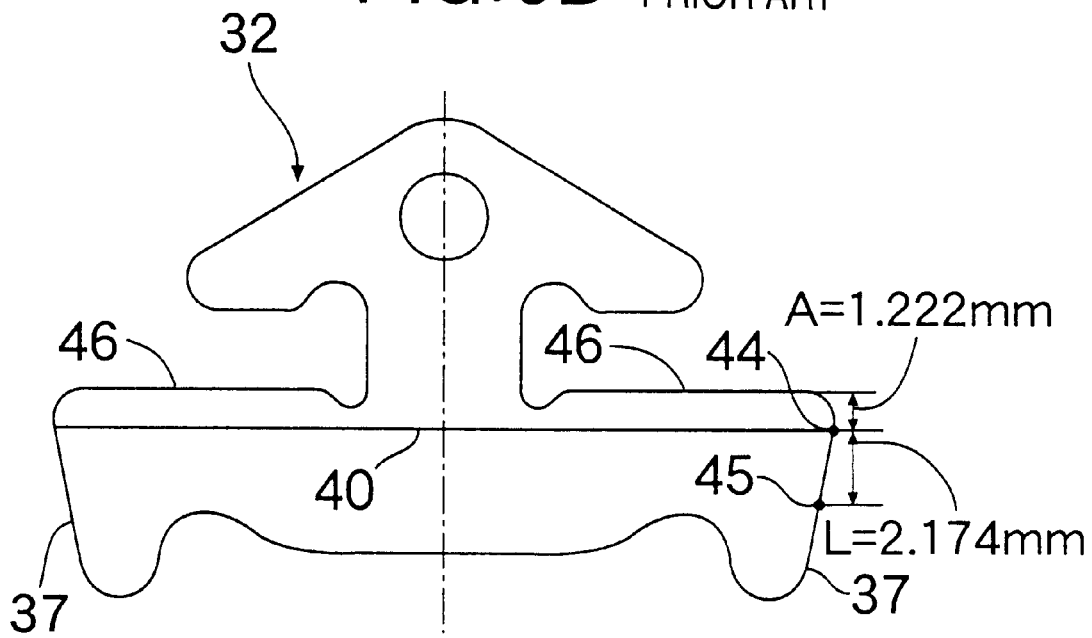
Figure 7A:
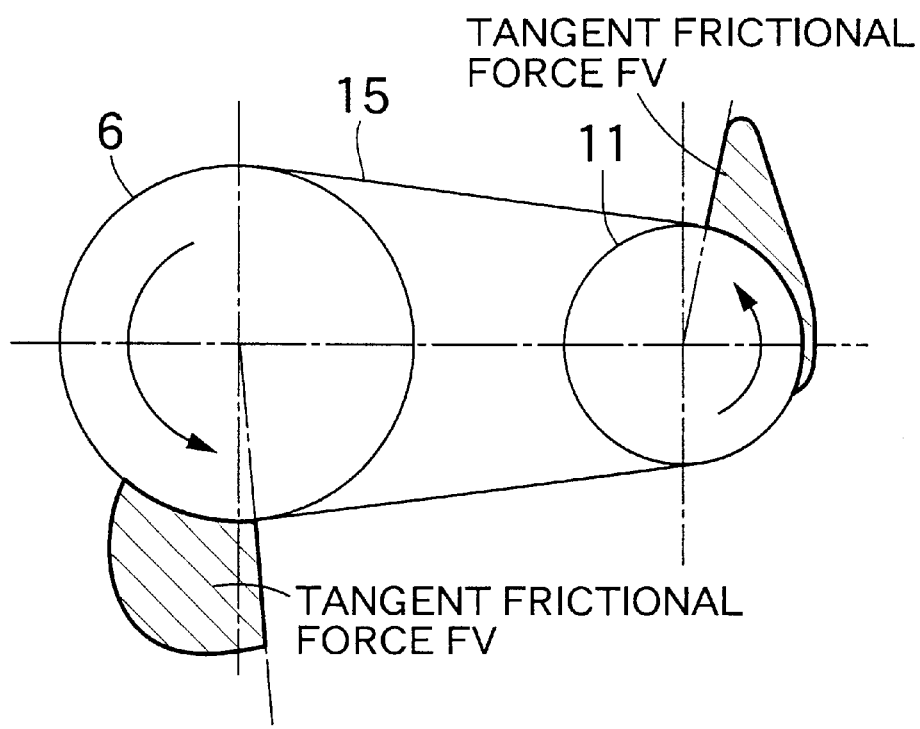
FIGS. 7A and 7B are diagrams each showing the distributions of a tangent frictional force of the metal element and the urging force between the metal elements.
Figure 7B:
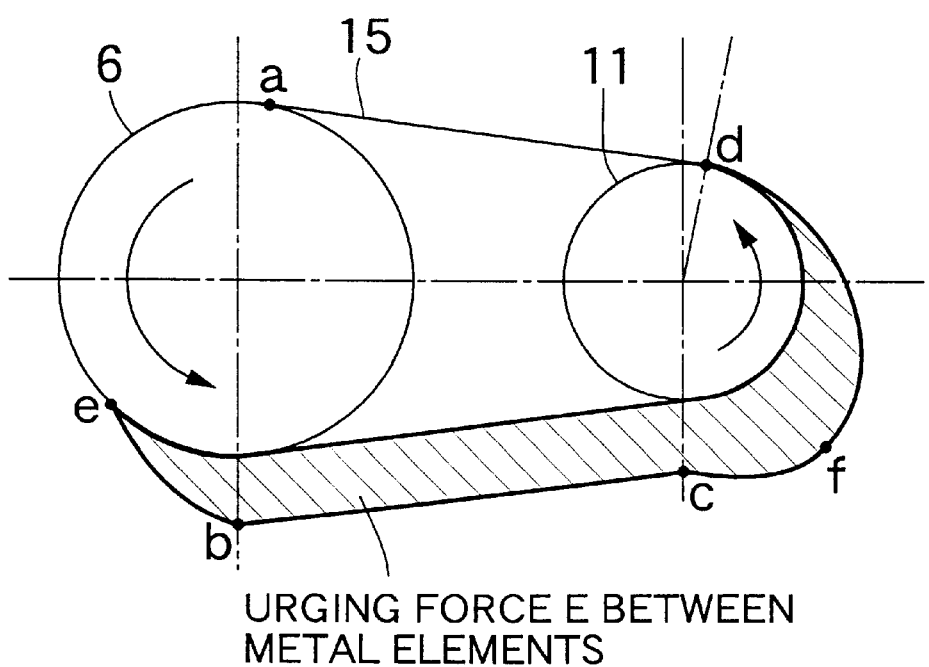
Figure 8:
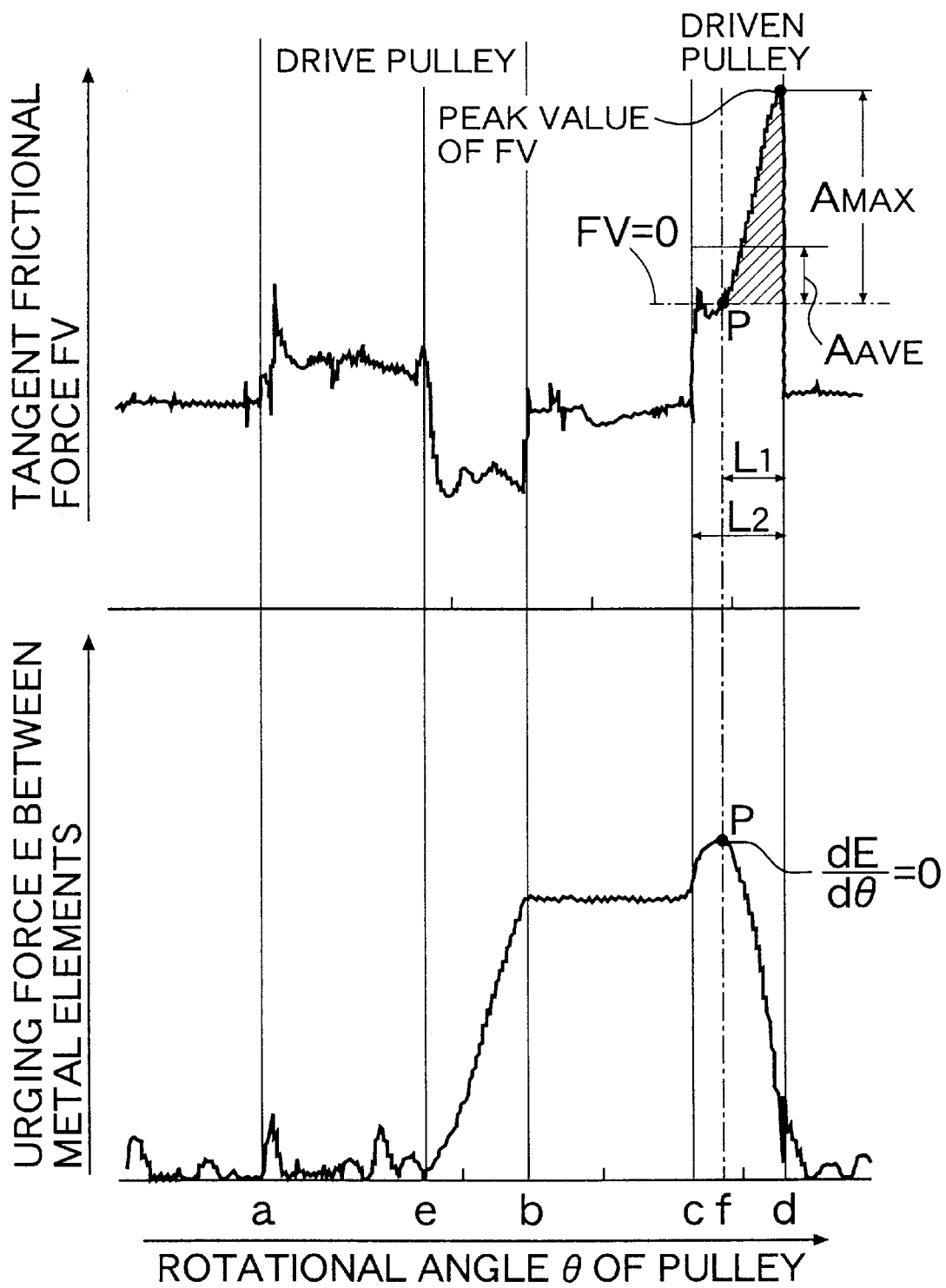
FIG. 8 is a graph showing the results of measurement of the tangent frictional force of the metal element and the urging force between the metal elements.
Figure 9A:
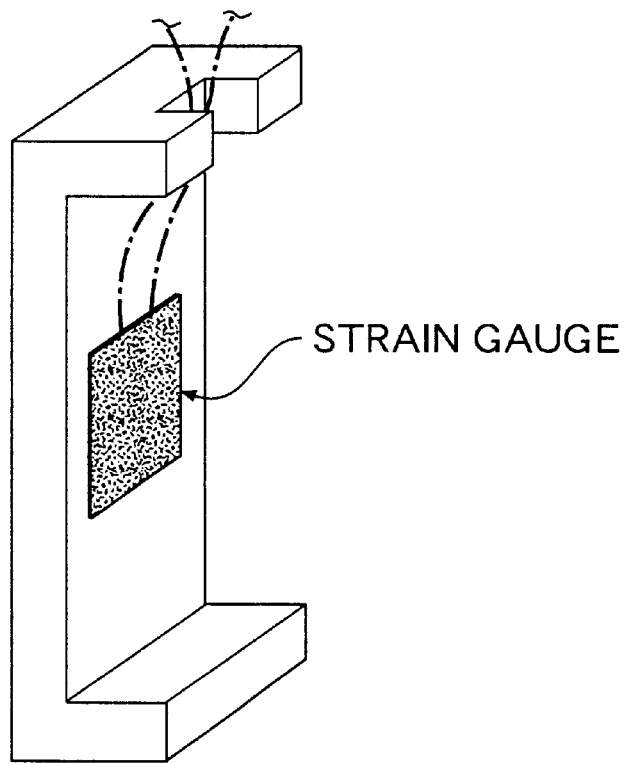
FIGS. 9A and 9B are views showing a sensor for measuring the urging force between the metal elements.
Figure 9B:
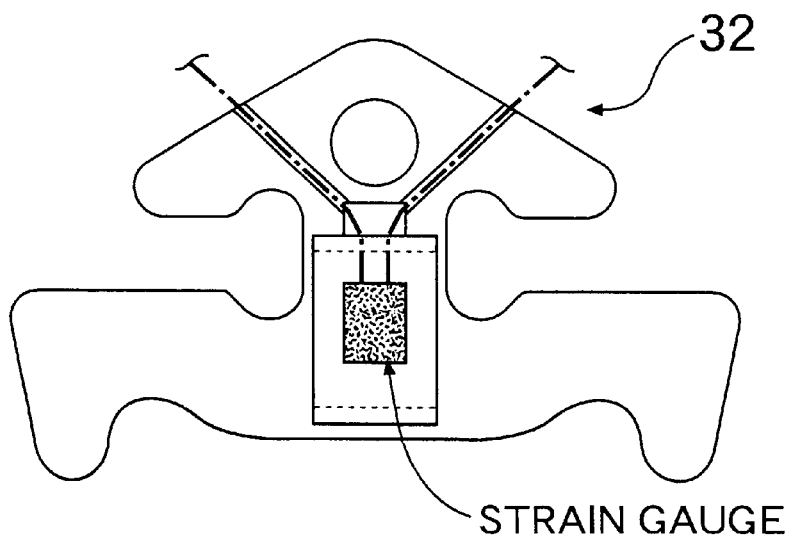
Figure 10:
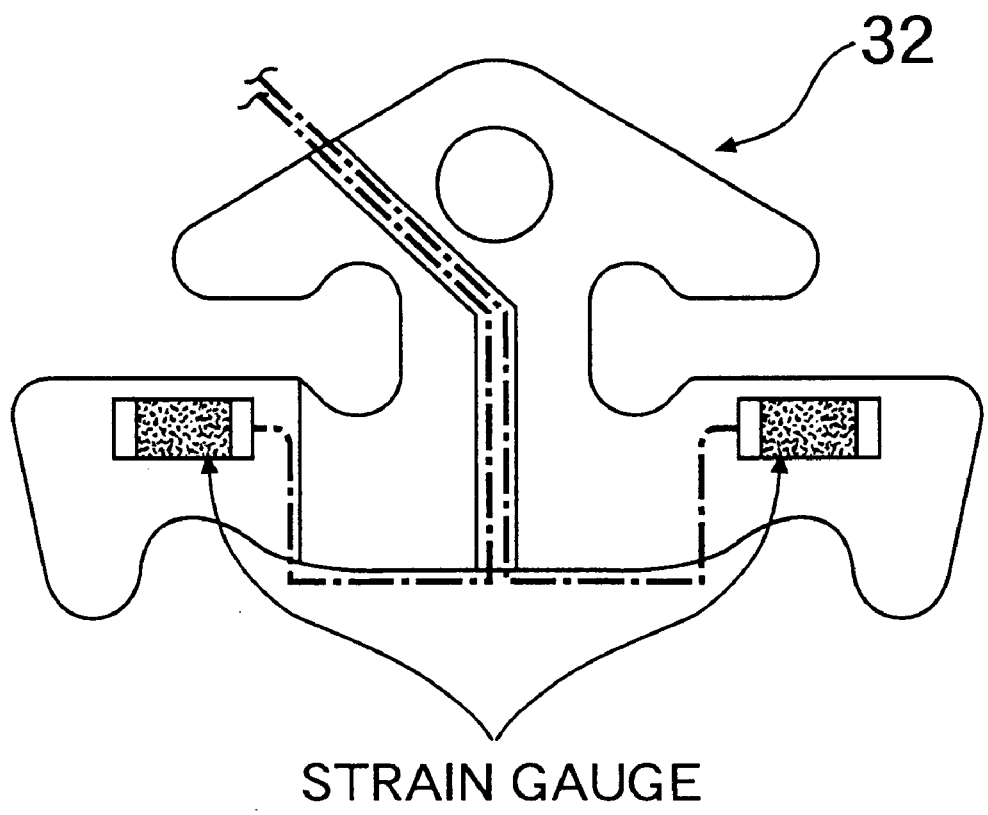
FIG. 10 is a view showing a sensor for measuring the tangent frictional force of the metal element.

FIG. 6B shows the shape of a conventional metal element 32. In this metal element 32, the distance A between the rocking edge 40 and the saddle surface 46 is set at 1.222 mm, and the distance L between the rocking edge 40 and the frictional force application point 45 is set at 2.174 mm. Therefore, the distance L is significantly larger than the distance A.

On the other hand, in the metal element 32 in the present embodiment shown in FIG. 6A, the expression, $2 \leq B/A \leq 5$ is satisfied and the height of the pulley abutment surface 37 of the metal element 32 is reduced to a value smaller than that in the conventional metal element, whereby the position of the frictional force application point 45 is displaced upwardly to a point close to the rocking edge 40. As a result, the distance A between the rocking edge 40 and the saddle surface 46 is set at 1.000 mm, and the distance L between the rocking edge 40 and the frictional force application point 45 is set at 1.153 mm. Therefore, the distance L and the distance A are substantially equal to each other.

As is apparent from the comparison of FIGS. 6A and 6B with each other, in the conventional metal element (see FIG. 6B) in which the distance L between the rocking edge 40 and the frictional force application point 45 is larger, a large pitching moment is applied about the pivot center 44 by the tangent frictional force FV applied to the frictional force application point 45, whereby the attitude of the metal element 32 engaged with the driven pulley 11 is liable to be unstable. On the other hand, in the metal element (see FIG. 6A) in the present embodiment in which the distance L is smaller than that in the conventional metal element, because the distances L and A are substantially equal to each other, the pitching moment is smaller and hence, the attitude of the metal element 32 engaged with the driven pulley 11 is stable. Moreover, the edges of the saddle surfaces 46, 46 are prevented from being placed in strong contact with the lower surfaces of the metal ring assemblies 31, 31 by the stability of the attitude of the metal element 32, leading to an enhancement in durability of the metal ring assemblies 31, 31.

Particularly, the setting of $2 \leq B/A \leq 5$ ensures that, even if a large tangent frictional force FV is applied to the metal element 32 in the exit region of the driven pulley 11, a pitching moment generated to displace the metal element 32 by the tangent frictional force FV can be suppressed by a pitching moment generated in the opposite direction by the load FL in the radial direction inwardly causing the metal ring assemblies 31, 31 to urge the saddle surfaces 46, 46, thereby reliably preventing the displacement of the metal element 32, and also preventing the metal element 32 from being displaced rearwardly in the direction of movement in the exit region of the driven pulley 11. Thus, the gap between the metal elements 32 can be effectively reduced in the chord section extending from the driven pulley 11 to the drive pulley 6.

It will therefore be appreciated that, as discussed above, according to one aspect of the present invention, the distance A between the rocking edge and the saddle surface of the metal element and the distance L between the rocking edge and the frictional force application point of the pulley abutment surface of the metal element are set to be substantially equal to each other. Therefore, the frictional force application point can be set to be close to the rocking edge to the utmost, thereby reducing the pitching moment generated about the rocking edge by the tangent frictional force applied to the frictional force application point. As a result, even if a large tangent frictional force is applied to the frictional force application point of the metal element, the pitching caused by the tangent frictional force can be suppressed to the minimum to stabilize the attitude of the metal element, and it is possible to prevent an upper surface of the metal ring assembly from being brought into contact with the upper edge of the ring slot to reduce the durability of the metal ring assembly.

According to another aspect of the present invention, the distance A between the rocking edge and the saddle surface and the distance B between the saddle surface and the lower end of the pulley abutment surface satisfy the relation, $B/A \leq 5$. Therefore, even when the tangent frictional force reaches the peak value in the exit region of the driven pulley, the pitching moment generated by the tangent frictional force and acting to displace the metal element forwardly in the direction of movement can be suppressed by the pitching moment generated in the opposite direction by the load in the radial direction inwardly transmitted from the metal ring assembly to the ring slot, thereby reliably preventing the displacement of the metal element. In addition, the distances A and B satisfy the relation, $2 \leq B/A$ and hence, it is possible to prevent the metal element from being displaced rearwardly in the direction of movement in the exit region of the driven pulley, and to effectively reduce the gap between the metal elements spaced apart from each other in the chord section extending from the driven pulley to the drive pulley.

Although the embodiment of the present invention has been described in detail, it will be understood that various modifications in design may be made without departing from the subject matter of the present invention.

For example, although the metal element 32 in the embodiment includes a pair of ring slots 35, 35, the present invention is also applicable to such a modification in which the metal element 32 includes only one ring slot 35 in the center thereof. In this case, the number of the metal ring assembly 31 which is mounted on the element 32 and fitted into the ring slot 35 is also one.

What is claimed is:

1. A belt for a continuously variable transmission comprising:

a metal ring assembly including a plurality of endless metal rings laminated one on another, and a large number of metal elements each having a ring slot into which the metal ring assembly is fitted, the belt being wound around a drive pulley and a driven pulley to transmit a driving force between the drive pulley and the driven pulley; and said metal element including:

an axially symmetrical body containing on each side of an axis thereof a saddle surface upon which a lower surface of the metal ring assembly fitted in the ring slot is received, a pulley abutment surface provided below the slot and operative to abut against the drive pulley and the driven pulley, and a rocking edge about which adjacent metal elements are pitched relative to each other, wherein the distance between the rocking edge and the saddle surface of the metal element and the distance between the rocking edge and a frictional force application point, determined as the point of application of resultant friction forces on the pulley abutment surface of the metal element, are set to be substantially equal to each other, said frictional force application point lying substantially in a center in a upward and downward direction of said pulley abutment service.

2. A belt for a continuously variable transmission as defined in claim 1, wherein each metal element having a thickness t and a distance B between the saddle surface and the lower end of the pulley abutment surface, is formed according to the formulas: $B/2 = A + L$ and $t = 1.5 A$, and the distances A and B are set so that the ratio of B/A is $2 \leq B/A \leq 5$.

* * * * *